United States Patent
Aramaki et al.

(10) Patent No.: US 11,765,312 B2
(45) Date of Patent: *Sep. 19, 2023

(54) IMAGE PROCESSING APPARATUS, IMAGE PROCESSING APPARATUS CONTROL METHOD, AND NON-TRANSITORY COMPUTER-READABLE STORAGE MEDIUM

(71) Applicant: CANON KABUSHIKI KAISHA, Tokyo (JP)

(72) Inventors: Yuji Aramaki, Yokohama (JP); Kazunari Iwamoto, Kariya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,552

(22) Filed: Oct. 1, 2021

(65) Prior Publication Data
US 2022/0030180 A1    Jan. 27, 2022

Related U.S. Application Data

(63) Continuation of application No. 16/507,517, filed on Jul. 10, 2019, now Pat. No. 11,165,974.

(30) Foreign Application Priority Data
Aug. 1, 2018 (JP) ................. 2018-145412

(51) Int. Cl.
*H04N 5/272* (2006.01)
*G06T 7/194* (2017.01)
(Continued)

(52) U.S. Cl.
CPC ............. *H04N 5/272* (2013.01); *G06T 7/174* (2017.01); *G06T 7/194* (2017.01); *G06T 11/60* (2013.01)

(58) Field of Classification Search
None
See application file for complete search history.

(56) References Cited

U.S. PATENT DOCUMENTS 11,048,929 B2    6/2021    Iwamoto
2003/0231769 A1  12/2003   Bolle
(Continued)

FOREIGN PATENT DOCUMENTS

CN    103312960 A    9/2013
EP    3246874 A1    11/2017
(Continued)

OTHER PUBLICATIONS

Notification of Reason for Refusal issued by the Korean Patent Office dated May 17, 2022 in corresponding KR Patent Application No. 10-2019-0089550, with English translation.
(Continued)

*Primary Examiner* — Robert Bader
(74) *Attorney, Agent, or Firm* — Carter, DeLuca & Farrell LLP

(57) ABSTRACT

An image processing apparatus which extracts a region of a foreground object in a captured image obtained by an imaging unit, and controls a display unit to display an output image formed by superimposing, on a predetermined image, a first image formed by anonymizing the extracted region, and a second image formed by anonymizing a region designated by a user on the captured image, wherein an appearance of the second image is different from an appearance of the first image, a region of a foreground object is extracted from a region other than at least the designated region in the captured image, and even when the designated region contains the foreground object, the first image in the designated region is not displayed on the output image.

6 Claims, 8 Drawing Sheets

(51) Int. Cl.
　　　*G06T 7/174*　　　(2017.01)
　　　*G06T 11/60*　　　(2006.01)

(56) References Cited

U.S. PATENT DOCUMENTS

| | | |
|---|---|---|
| 2005/0275723 A1 | 12/2005 | Sablak et al. |
| 2009/0128632 A1 | 5/2009 | Goto et al. |
| 2013/0027549 A1 | 1/2013 | Evangelio et al. |
| 2016/0247039 A1 | 8/2016 | Yazaki |
| 2018/0107870 A1 | 4/2018 | Iwamoto |
| 2018/0255326 A1 | 9/2018 | Oya |
| 2019/0073813 A1 | 3/2019 | Ito |

FOREIGN PATENT DOCUMENTS

| | | |
|---|---|---|
| EP | 3246847 A1 | 2/2018 |
| JP | 2016158156 A | 9/2016 |
| KR | 10-2017-0129051 A | 11/2017 |
| WO | 2007076890 A1 | 7/2007 |

OTHER PUBLICATIONS

Extended European Search Report issued by the European Patent Office dated Dec. 4, 2019 in corresponding European Patent Application No. 19185195.5.

CN Office Action issued by the China National Intellectual Property Administration dated Jun. 4, 2021 in corresponding CN Patent Application No. 201910639900.3. Translation to follow upon availability.

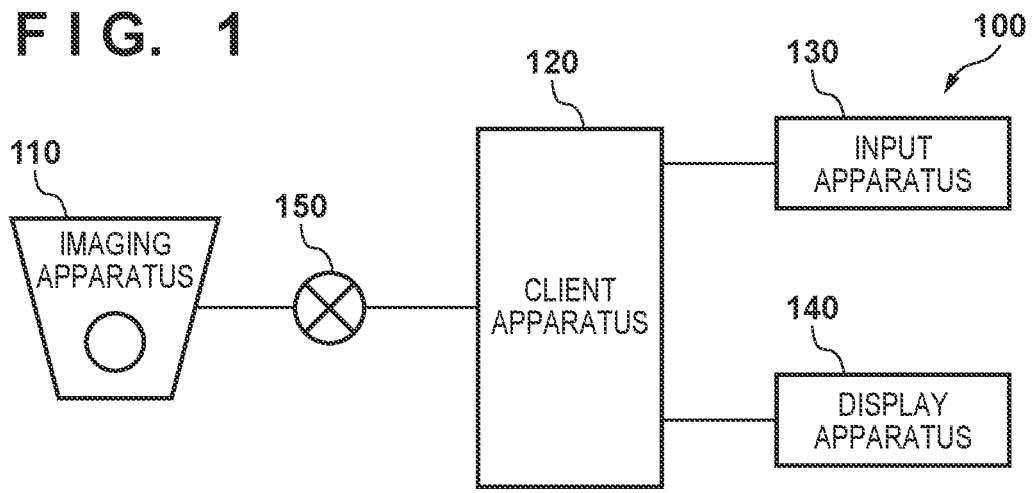
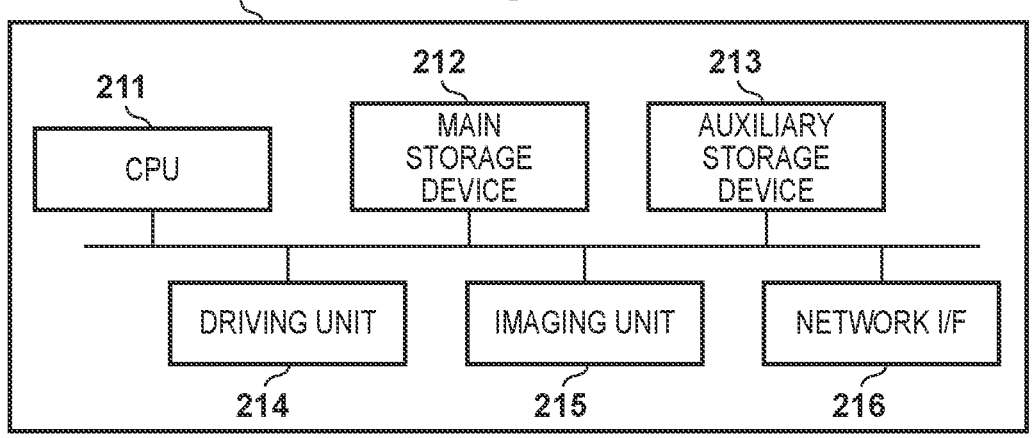
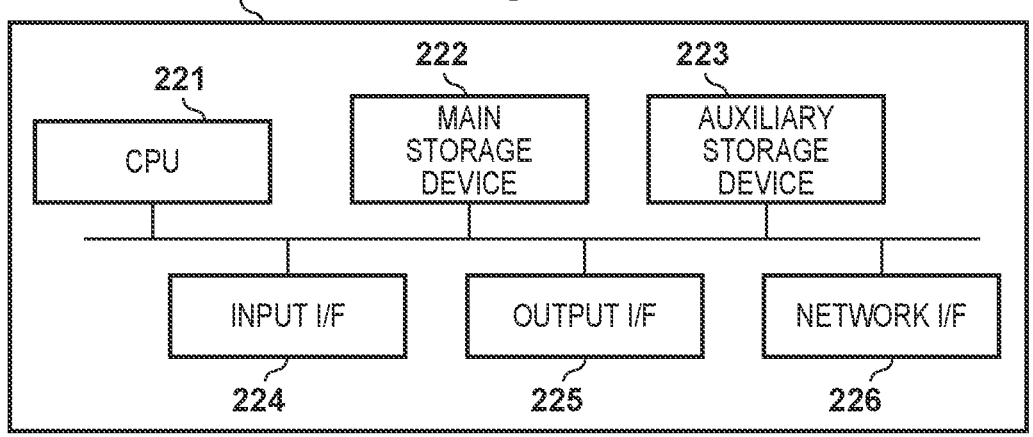

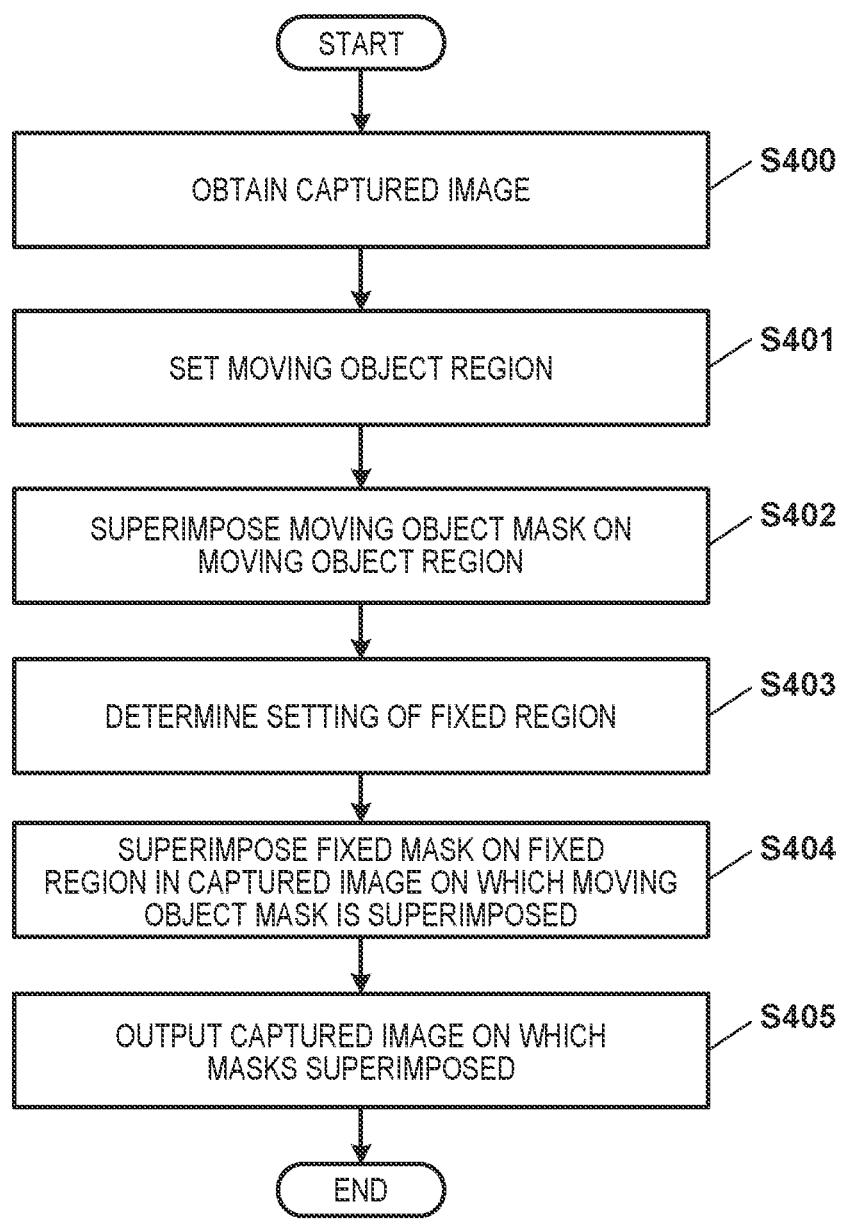

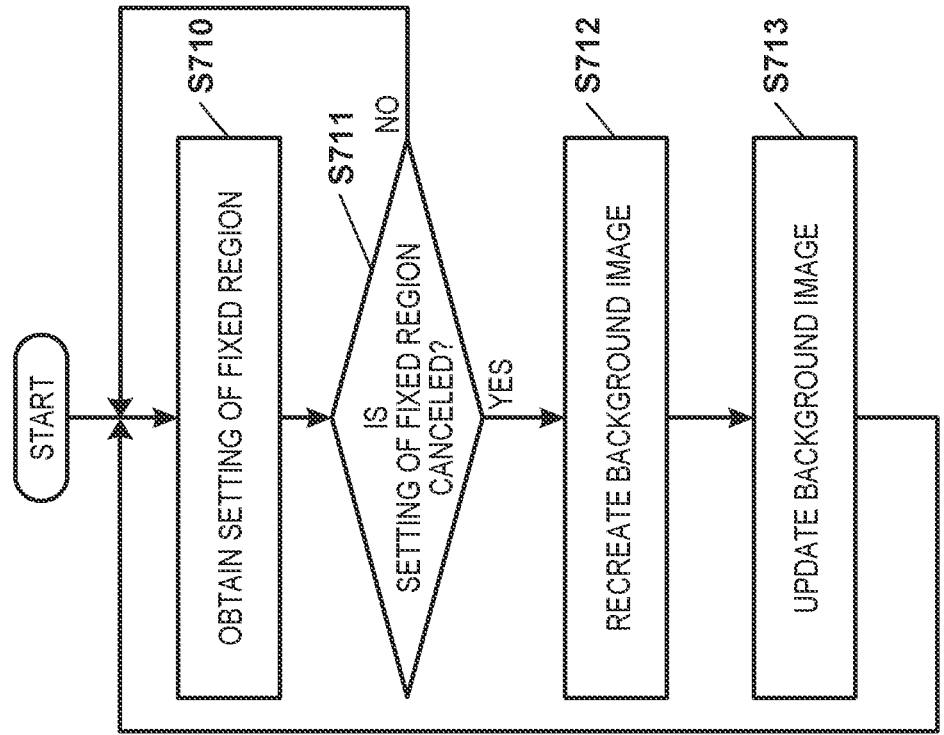
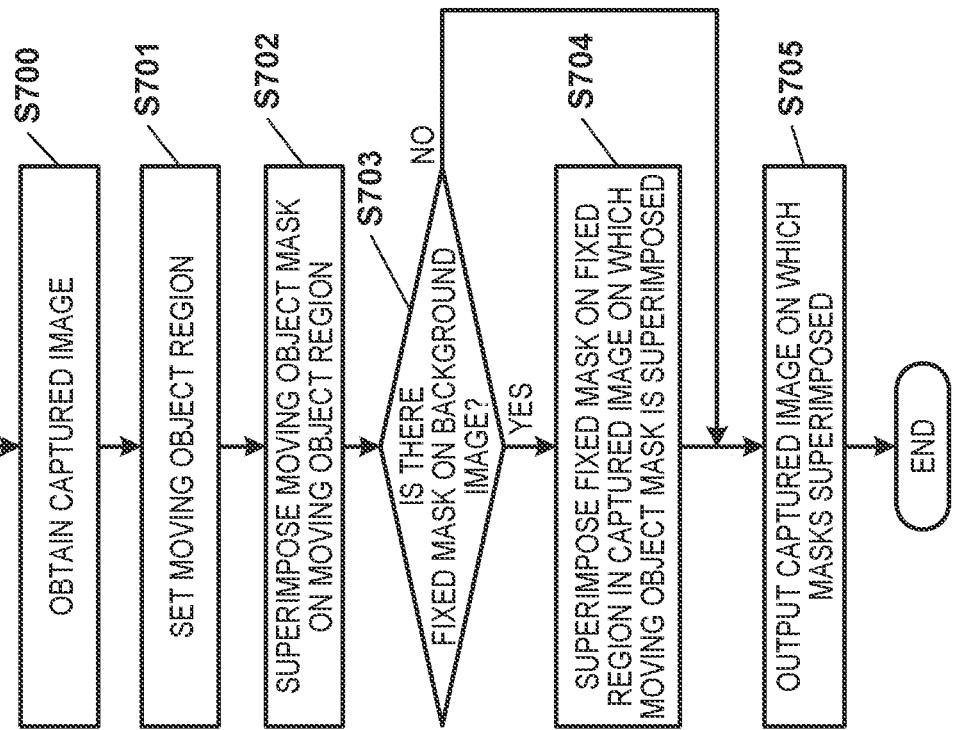

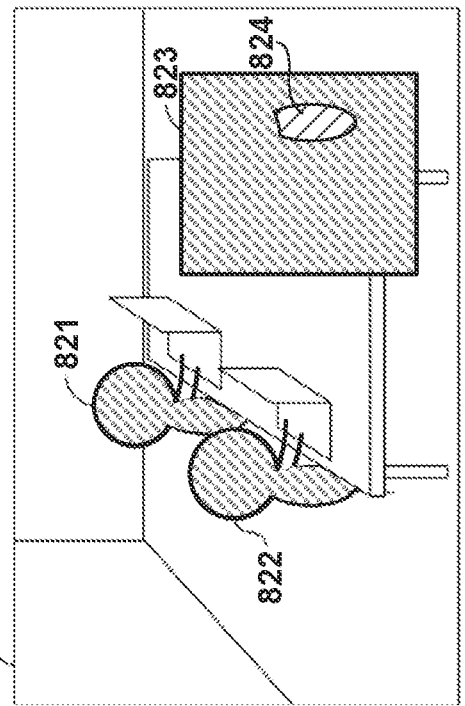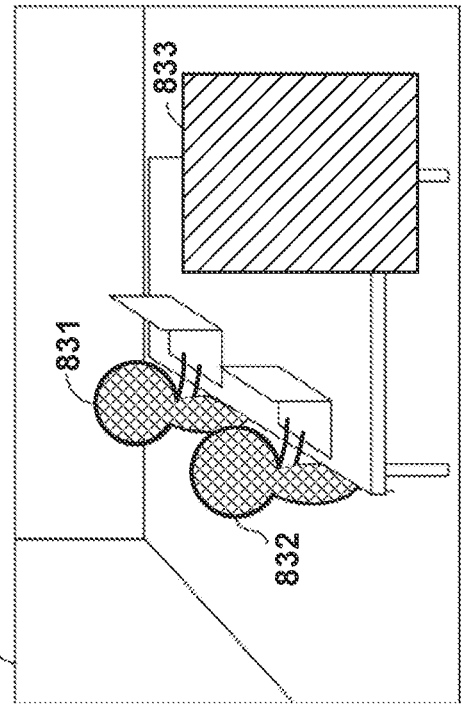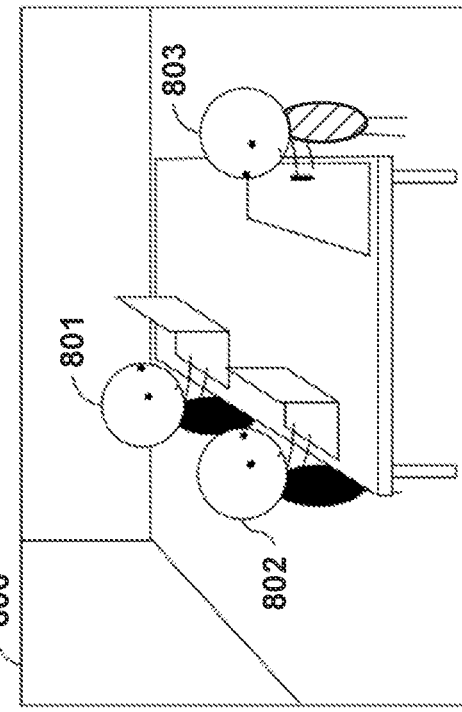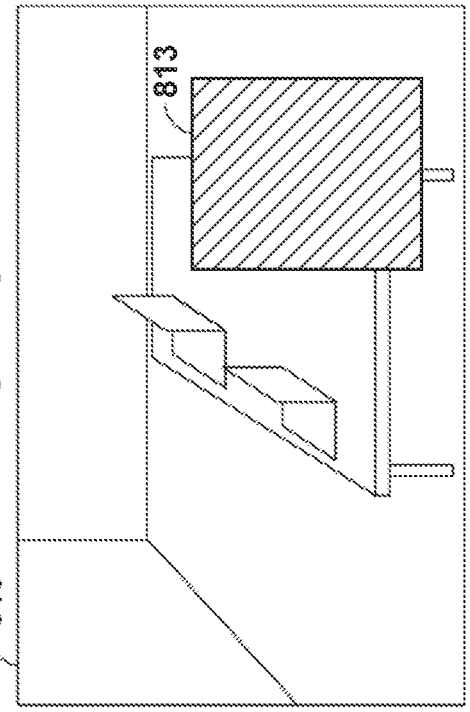

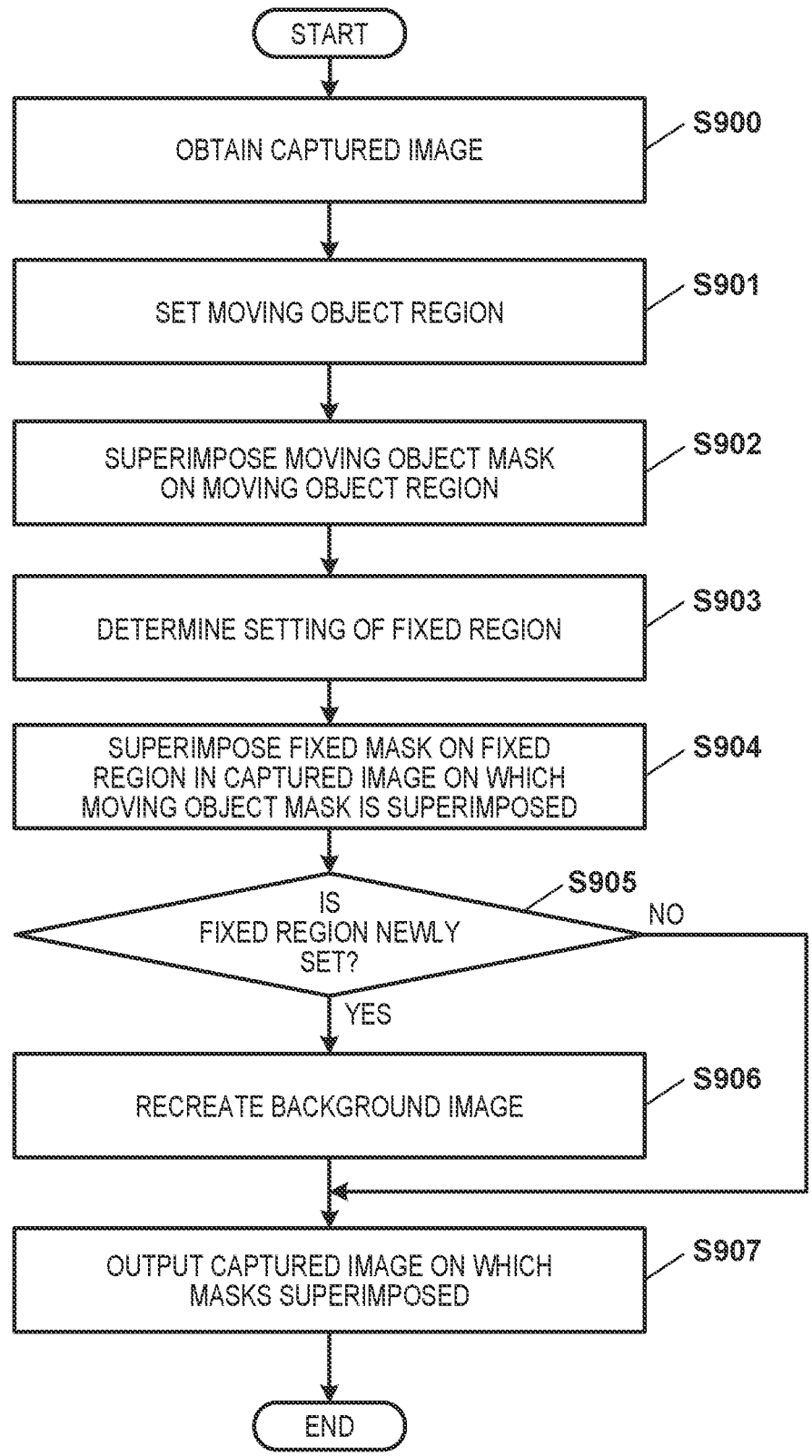

IMAGE PROCESSING APPARATUS, IMAGE PROCESSING APPARATUS CONTROL METHOD, AND NON-TRANSITORY COMPUTER-READABLE STORAGE MEDIUM

CROSS REFERENCE TO RELATED APPLICATIONS

This application is a continuation of U.S. patent application Ser. No. 16/507,517, filed on Jul. 10, 2019, which claims the benefit of and priority to Japanese Patent Application No. 2018-145412, filed on Aug. 1, 2018, each of which is hereby incorporated by reference herein in their entirety.

BACKGROUND OF THE INVENTION

Field of the Invention

The present disclosure relates to an image processing apparatus, an image processing apparatus control method, and a non-transitory computer-readable storage medium.

Description of the Related Art

A technique that fixedly superimposes a mask on a specific region in an image captured by a monitoring camera or the like in order to secure the security or privacy of the specific region is known. In this specification, a mask to be fixedly superimposed on a specific region will be called a fixed mask hereinafter. Also, a technique that, when an image contains a moving object, superimposes a mask on a region (moving object region) including the moving object in the image by taking account of the privacy of the moving object is known. In this specification, a mask to be superimposed on a moving object region will be called a moving object mask hereinafter.

Japanese Patent Laid-Open No. 2016-158156 discloses a method of superimposing a moving object mask on only a moving object outside a region set by the user, in order to prevent the moving object mask from being superimposed on a parcel conveyed in a distribution center.

In this technique disclosed in Japanese Patent Laid-Open No. 2016-158156, if a fixed region includes a region where a moving object mask may be rendered in an image and the moving object mask is superimposed on a fixed mask rendered in the fixed region, the existence of the moving object in the fixed region may be notified. In this case, an intended concealment of the fixed region by the fixed mask may become insufficient.

SUMMARY OF THE INVENTION

A technique for reliably implementing the concealment of a fixed region will be provided.

One aspect of embodiments relates to an image processing apparatus comprising an extraction unit configured to extract a region of a foreground object in a captured image obtained by an imaging unit, and a display control unit configured to cause a display unit to display an output image formed by superimposing, on a predetermined image, a first image formed by anonymizing the region extracted by the extraction unit, and a second image formed by anonymizing a region designated by a user on the captured image obtained by the imaging unit, wherein an appearance of the second image is different from an appearance of the first image, the extraction unit extracts a region of a foreground object from a region other than at least the designated region in the captured image obtained by the imaging unit, and even when the designated region contains the foreground object, the first image formed by anonymizing the region of the foreground object in the designated region is not displayed on the output image displayed on the display unit by the display control unit.

Further features of the present invention will become apparent from the following description of exemplary embodiments (with reference to the attached drawings).

BRIEF DESCRIPTION OF THE DRAWINGS

FIG. 1 is a view showing a configuration example of a system corresponding to an exemplary embodiment;

FIG. 2A is a block diagram showing a hardware configuration example of an imaging apparatus 110 corresponding to the exemplary embodiment;

FIG. 2B is a block diagram showing a hardware configuration example of a client apparatus 120 corresponding to the exemplary embodiment;

FIG. 4 is a flowchart showing an example of processing to be performed by the client apparatus 120 corresponding to the first embodiment;

FIGS. 7A and 7B are flowcharts showing examples of processing to be performed by the client apparatus 120 corresponding to the second embodiment;

FIGS. 8A to 8D are views for explaining image processing corresponding to captured images corresponding to the second embodiment; and FIG. 9 is a flowchart showing an example of processing to be performed by a client apparatus 120 corresponding to the third embodiment.

DESCRIPTION OF THE EMBODIMENTS

First Embodiment

Figure 3A:
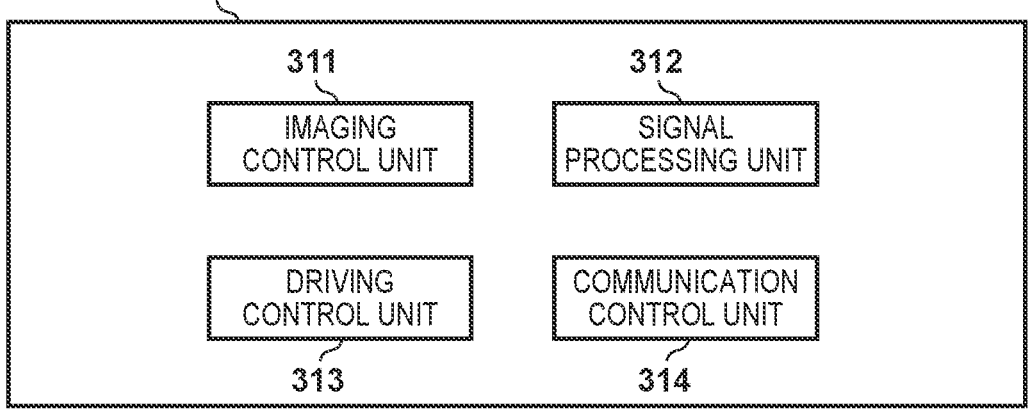
FIG. 3A is a block diagram showing a functional configuration example of the imaging apparatus 110 corresponding to the exemplary embodiment.

An exemplary embodiment will be explained below with reference to the accompanying drawings. In a system corresponding to this embodiment, a moving object is detected in an image obtained by imaging a predetermined real space, and a moving object mask as a first mask is superimposed on the detected moving object. In addition, a fixed mask as a second mask is further superimposed on the image on which the moving object mask is superimposed, based on information of a fixed region that is preset in the captured image. An image obtained as described above on which the two types of masks, that is, the moving object mask and the fixed mask are superimposed is output (displayed).

In this embodiment, a moving object includes a person, a vehicle, or another arbitrary body. The moving object can include an arbitrary body as long as the body is an object detectable based on the difference between a background image created based on, for example, an image obtained by imaging a real space where the moving object does not exist, and the captured image. Also, an object can move in a real space as an imaging target, and can stay or can be standing still in a predetermined place in the real space.

FIG. 1 is a view showing an example of a system configuration corresponding to the exemplary embodiment. As shown in FIG. 1, a system 100 of this embodiment includes an imaging apparatus 110, a client apparatus 120, an input apparatus 130, a display apparatus 140, and a network 150. This configuration of the system 100 shown in FIG. 1 is merely an example, so it is also possible to further add other constituent elements other than these constituent elements. Each constituent element will be explained below.

The imaging apparatus 110 is an imaging apparatus such as a network camera. The imaging apparatus 110 generates a captured image by imaging a real space in accordance with imaging parameters such as a posture and a viewing angle set in the client apparatus 120, and transmits the captured image to the client apparatus 120 across the network 150. The imaging apparatus 110 can include a plurality of network cameras instead of a single network camera.

The client apparatus 120 receives a captured image from the imaging apparatus 110 across the network 150. The client apparatus 120 detects a moving object from the received captured image, and sets a moving object region in the captured image based on the detected moving object. Also, the client apparatus 120 superimposes a moving object mask on the moving object region, and superimposes a fixed mask on a fixed region that is preset in the captured image. The client apparatus 120 outputs the captured image on which the moving object mask and the fixed mask are superimposed to the display apparatus 140, thereby displaying the image.

The input apparatus 130 includes user interfaces such as a keyboard, a mouse, and a touch panel, and the user can input various instructions to the client apparatus 120 by operating the input apparatus 130. The display apparatus 140 is a CRT, a liquid crystal display, or the like, and can display processing results from the client apparatus 120 by using images, characters, and the like.

Note that FIG. 1 shows the client apparatus 120, the input apparatus 130, and the display apparatus 140 as independent apparatuses, but the embodiment is not limited to this configuration. For example, it is also possible to integrate these apparatuses into a single apparatus, integrate the client apparatus 120 and the display apparatus 140, or integrate the input apparatus 130 and the display apparatus 140. The client apparatus 120 and the imaging apparatus 110 can also be integrated.

The network 150 is a network that connects the imaging apparatus 110 and the client apparatus 120 so that they can communicate with each other. The network 150 includes routers, switches, cables, and the like satisfying the communication standard such as Ethernet®. In this embodiment, the network 150 need only be able to perform communication between the imaging apparatus 110 and the client apparatus 120, and the communication standard, scale, and configuration of the network 150 do not matter. For example, the network 150 can be the Internet, a wired LAN (Local Area Network), a wireless LAN, or a WAN (Wide Area Network).

The hardware configurations of the imaging apparatus 110 and the client apparatus 120 will be explained below with reference to FIGS. 2A and 2B. First, a hardware configuration example of the imaging apparatus 110 will be explained by using a block diagram of FIG. 2A. As shown in FIG. 2A, the imaging apparatus 110 can include a CPU 211, a main storage device 212, an auxiliary storage device 213, a driving unit 214, and an imaging unit 215. Note that this configuration shown in FIG. 2A is merely an example of a configuration applicable to the imaging apparatus 110, and can be modified/changed as needed.

The CPU 211 executes processing by using computer programs and data stored in the main storage device 212. Thus, the CPU 211 controls the operation of the whole imaging apparatus 110, and executes or controls each processing (to be described later) to be executed by the imaging apparatus 110. For example, the CPU 211 implements the function of each functional unit shown in FIG. 3A by executing processing by using the computer programs and data stored in the main storage device 212. Details of these functional units will be described later.

The main storage device 212 is a storage device such as a RAM (Random Access Memory). The main storage device 212 has an area for storing computer programs and data loaded from the auxiliary storage device 213, captured images obtained by the imaging unit 215, and various kinds of data received from the client apparatus 120 via a network I/F 216. In addition, the main storage device 212 has a work area which the CPU 211 uses when executing various kinds of processing. Thus, the main storage device 212 can provide various areas as needed.

The auxiliary storage device 213 is a large-capacity storage device such as a hard disk drive (HDD), a ROM (Read Only Memory), or an SSD (Solid State Drive). The auxiliary storage device 213 stores an OS (Operating System), and computer programs and data for causing the CPU 211 to execute or control each processing (to be described later) to be executed by the imaging apparatus 110. The auxiliary storage device 213 also stores data (for example, the abovementioned imaging parameters) received from the client apparatus 120 via the network I/F 216. The computer programs and data stored in the auxiliary storage device 213 are loaded into the main storage device 212 as needed under the control of the CPU 211, and processed by the CPU 211.

The driving unit 214 drives the imaging unit 215 based on imaging parameters received from the client apparatus 120, and controls the posture (imaging direction), the viewing angle, and the like of the imaging unit 215. Control targets of the driving unit 214 are not limited to specific targets, but can be one or both of the posture and viewing angle of the imaging unit 215, and can also be another target (for example, the position of the imaging unit 215). Furthermore, the position, posture, and viewing angle of the imaging unit 215 may also be fixed. In this case, the driving unit 214 is unnecessary.

The imaging unit 215 includes an imaging element and an optical system, and forms an image of an object on the imaging element by using, as an imaging center, the intersection of the optical axis of the optical system and the imaging element. Examples of the imaging element are a CMOS (Complementary Metal-Oxide Semiconductor) and a CCD (Charge Coupled Device). The network I/F 216 is an interface which the imaging apparatus 110 uses to perform data communication with the client apparatus 120 across the network 150.

FIG. 2B is a view showing a hardware configuration example of the client apparatus 120. As shown in FIG. 2B, the client apparatus 120 includes a CPU 221, a main storage device 222, an auxiliary storage device 223, an input I/F 224, an output I/F 225, and a network I/F 226.

The CPU 221 executes processing by using computer programs and data stored in the main storage device 222, thereby controlling the operation of the whole client apparatus 120, and executing or controlling each processing (to be described later) to be performed by the client apparatus 120. For example, the CPU 221 implements the function of each functional unit shown in FIG. 3B by executing processing by using the computer programs and data stored in the main storage device 222. Each functional unit shown in FIG. 3B will be described later.

The main storage device 222 is a storage device such as a RAM (Random Access Memory). The main storage device 222 has an area for storing computer programs and data loaded from the auxiliary storage device 223, and various kinds of data (for example, captured images) received from the imaging apparatus 110 via the network I/F 226. In addition, the main storage device 222 has a work area which the CPU 221 uses when executing various kinds of processing. Thus, the main storage device 222 can provide various areas as needed.

The auxiliary storage device 223 is a large-capacity storage device such as a hard disk drive (HDD), a ROM (Read Only Memory), or an SSD (Solid State Drive). The auxiliary storage device 223 stores an OS (Operating System), and computer programs and data for causing the CPU 221 to execute or control each processing (to be described later) to be executed by the client apparatus 120. The auxiliary storage device 223 also stores various kinds of data (for example, captured images) received from the imaging apparatus 110 via the network I/F 226, and background images for use in moving object detection. The computer programs and data stored in the auxiliary storage device 223 are loaded into the main storage device 222 as needed under the control of the CPU 221, and processed by the CPU 221.

The input I/F 224 is an interface for connecting the input apparatus 130 to the client apparatus 120. The output I/F 225 is an interface for connecting the display apparatus 140 to the client apparatus 120. The network I/F 226 is an interface which the client apparatus 120 uses to perform data communication with the imaging apparatus 110 across the network 150.

Figure 3B:
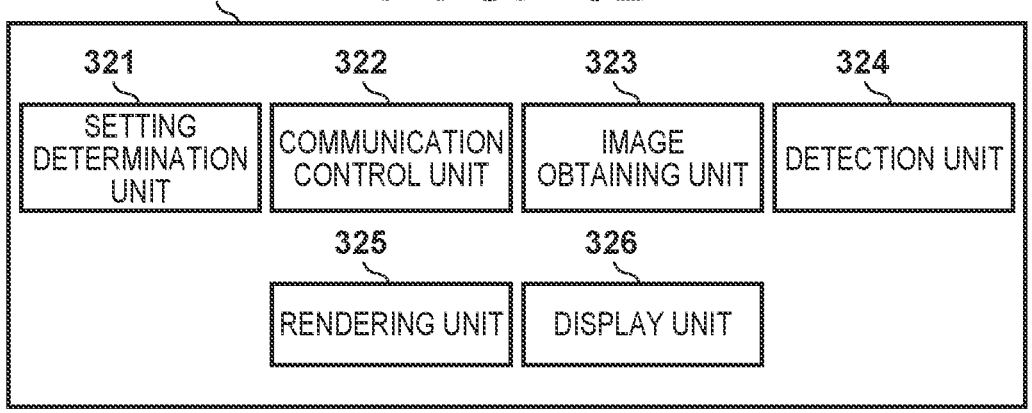
FIG. 3B is a block diagram showing a functional configuration example of the client apparatus 120 corresponding to the first embodiment.
Figure 3C:
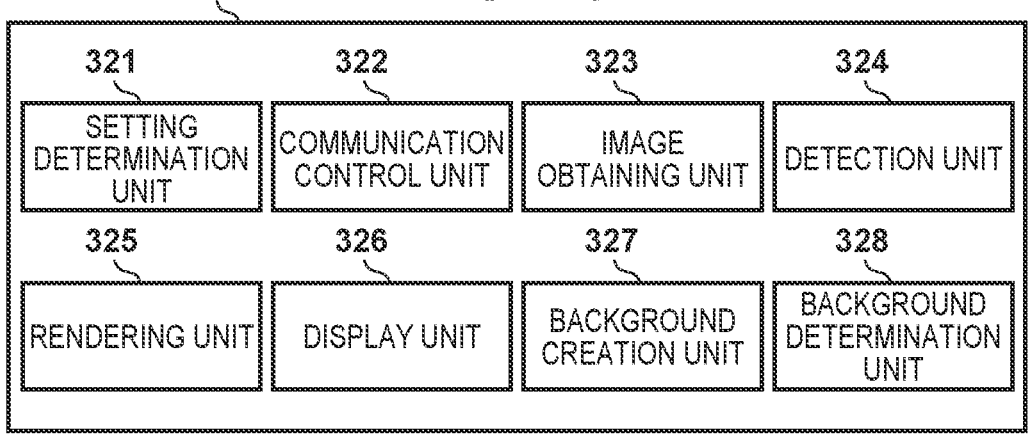
FIG. 3C is a block diagram showing another functional configuration example of the client apparatus 120 corresponding to the second and third embodiments.

The functional configurations of the imaging apparatus 110 and the client apparatus 120 will be explained below with reference to FIGS. 3A to 3C. FIG. 3A is a view showing a functional configuration example of the imaging apparatus 110 corresponding to the exemplary embodiment. Each functional unit shown in FIG. 3A can be installed as hardware, and can also be installed as software (a computer program). In the latter case, the computer program is stored in the auxiliary storage device 213. The CPU 211 loads the computer program into the main storage device 212 as needed and executes the program, thereby implementing the function of the corresponding functional unit.

As shown in FIG. 3A, the functional configuration of the imaging apparatus 110 can include an imaging control unit 311, a signal processing unit 312, a driving control unit 313, and a communication control unit 314. The imaging control unit 311 controls an imaging operation of the imaging unit 215, and obtains an image captured by the imaging unit 215 as a captured image. The signal processing unit 312 performs predetermined image processing on the captured image obtained by the imaging control unit 311. This image processing can include, for example, a developing process and an encoding process. Note that encoding for the captured image obtained by the imaging apparatus 110 is not essential, so the signal processing unit 312 need not perform any encoding process on the captured image.

The driving control unit 313 drives the imaging unit 215 based on imaging parameters received from the client apparatus 120, thereby controlling the posture (imaging direction), the viewing angle, and the like of the imaging unit 215. As described earlier, the posture (imaging direction), the viewing angle, and the like of the imaging unit 215 may also be fixed. The communication control unit 314 transmits the captured image processed by the signal processing unit 312 to the client apparatus 120 via the network I/F 216. Also, the communication control unit 314 receives, via the network I/F 216, control instructions (including imaging parameters) transmitted from the client apparatus 120 to the imaging apparatus 110.

A functional configuration example of the client apparatus 120 corresponding to this embodiment will be explained below by using a block diagram of FIG. 3B. Each functional unit shown in FIG. 3B can be installed as hardware, and can also be installed as software (a computer program). In the latter case, the computer program is stored in the auxiliary storage device 223. The CPU 221 loads the computer program into the main storage device 222 as needed and executes the program, thereby implementing the function of the corresponding functional unit. The functional configuration of the client apparatus 120 can include a setting determination unit 321, a communication control unit 322, an image obtaining unit 323, a detection unit 324, a rendering unit 325, and a display unit 326.

The setting determination unit 321 obtains setting information of a fixed region stored in the auxiliary storage device 223, and performs various kinds of determination regarding the setting of the fixed region (or the rendering of a fixed mask). This determination can include determination of whether the fixed region is set (or whether the rendering of the fixed mask is set), and, if this setting is performed, can include determination of the position and size of the fixed region (or the position and size of the rendering of the fixed mask). The determination can also include determination of whether the set fixed region (or the fixed mask to be rendered) is changed, or determination of whether the setting of the fixed region (or the rendering of the fixed mask) is canceled. The fixed region setting method is not limited to a specific setting method. For example, the user can set a fixed region on a captured image by operating the input apparatus 130 and store setting information of the fixed region in the auxiliary storage device 223 in advance. As another embodiment, assume that an object to be concealed is predetermined in a captured image in a place to which this system is applied. In this case, it is possible to obtain a captured image by operating the system 100, perform a process of detecting an object to be concealed in the captured image, determine a region where the detected object is concealed as a fixed region, and store the information in the auxiliary storage device 223. The setting information of the fixed region can be various kinds of information. For example, the setting information can be information of the position of the upper left corner and the position of the lower right corner of the fixed region, and can also be information of the position of the upper left corner of the fixed region and the vertical and horizontal sizes of the fixed region.

The communication control unit 322 obtains an (encoded) image transmitted from the imaging apparatus 110 via the network I/F 226. The communication control unit 322 also transmits control instructions for the imaging apparatus 110 to the imaging apparatus 110 via the network I/F 226. The image obtaining unit 323 obtains a captured image received from the imaging apparatus 110 by the communication control unit 322, and decodes the image. Note that if the imaging apparatus 110 transmits a captured image to the client apparatus 120 without encoding the image, the image obtaining unit 323 obtains the image received from the imaging apparatus 110 by the communication control unit 322 without decoding the image.

The detection unit 324 performs a moving object detection process on the captured image obtained by the image obtaining unit 323, and sets a region associated with the detected moving object as a moving object region. In the moving object detection process of this embodiment, a background difference method can be used to detect a moving object (foreground object) from a captured image. More specifically, a preobtained background image and a captured image are compared, and the difference between the luminance values of pixels in corresponding positions is calculated. The background image can be stored in the auxiliary storage device 223. It is determined that a region including a pixel for which the obtained difference exceeds a threshold is a moving object region. However, the method of implementing the moving object detection process is not limited to the background difference method, and can also be another well-known method. For example, this embodiment uses the difference between the luminance values, but it is also possible to handle RGB values as three-dimensional coordinates, and measure, as the difference, the distance between the RGB value of a background image and the RGB value of a captured image. In addition, the embodiment is not limited to the background difference, and a moving object may also be detected by calculating the moving direction of each coordinate in an image like an optical flow. Assume that no fixed mask is superimposed on a prepared background image in this embodiment.

The rendering unit 325 renders a moving object mask in a moving object region on a captured image, and renders a fixed mask in a fixed region on the captured image. Thus, the rendering unit 325 executes a process of anonymizing the moving object region and the fixed region. Note that the moving object mask corresponds to an image in which the moving object region is anonymized, and the fixed mask corresponds to an image in which the fixed region is anonymized. The display unit 326 causes the display apparatus 140 to display the captured image having undergone the rendering process performed by the rendering unit 325. Note that the functional configuration of the client apparatus 120 shown in FIG. 3C will be explained in the second and third embodiments (to be described later).

An example of an image output process in the client apparatus 120 corresponding to the exemplary embodiment will be explained below with reference to FIG. 4. In particular, a process of outputting an image obtained by superimposing a fixed mask on an image on which a moving object mask is superimposed by the client apparatus 120 will be explained. Processing complying with a flowchart shown in FIG. 4 is processing for one captured image obtained by the imaging apparatus 110. Accordingly, when the imaging apparatus 110 transmits a plurality of captured images to the client apparatus 120, the client apparatus 120 performs the processing complying with the flowchart shown in FIG. 4 on each captured image. To simplify the explanation, assume that the imaging apparatus 110 transmits an image without encoding it.

Figure 5A:
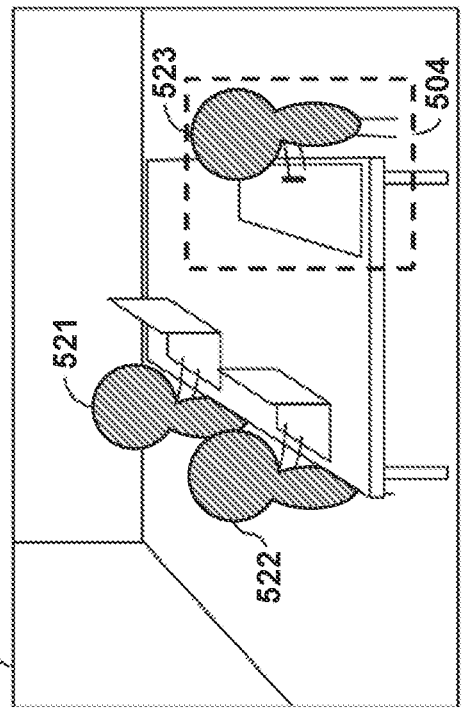
FIGS. 5A to 5D are views for explaining image processing for captured images corresponding to the first embodiment.
Figure 5C:
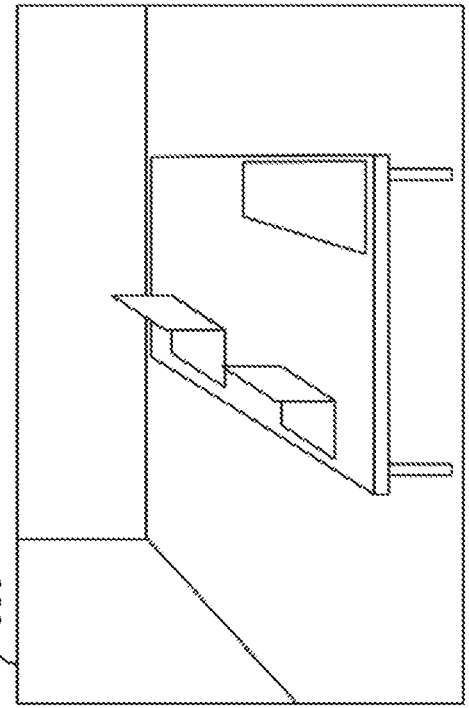
Figure 5B:
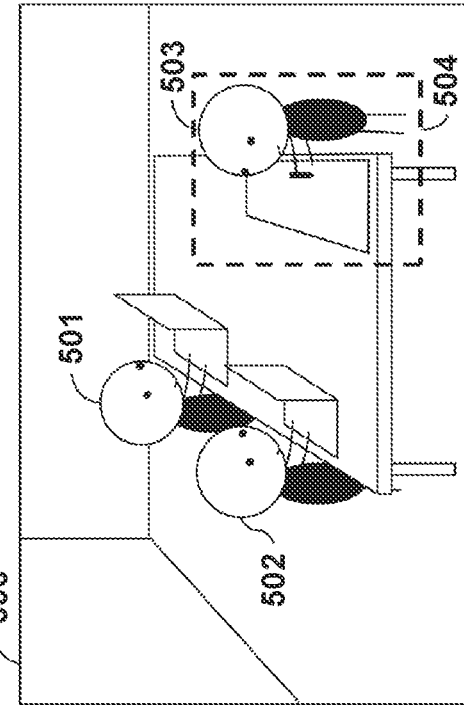

In step S400, the image obtaining unit 323 causes the main storage device 222 to store a captured image received by the communication control unit 322 from the imaging apparatus 110 via the network I/F 226. An example of the obtained captured image will be explained with reference to FIGS. 5A to 5D. An image 500 in FIG. 5A shows an example of a captured image containing workers 501, 502, and 503 as moving bodies. An image 510 in FIG. 5B shows an example of a captured image not containing a moving object such as the worker 501.

Figure 5D:
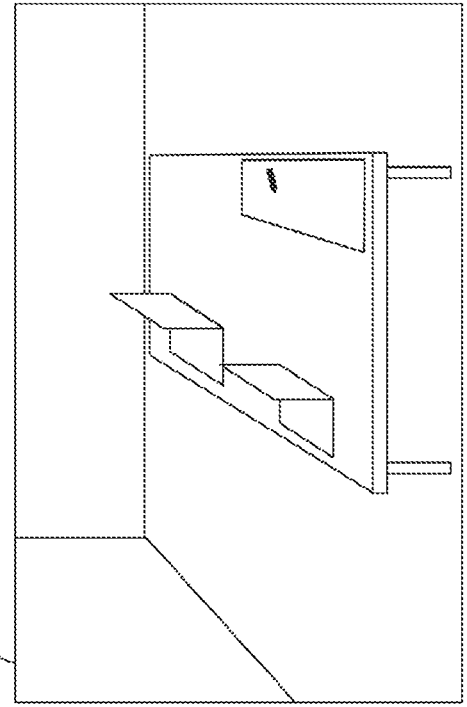

In step S401, the detection unit 324 detects a moving object by the abovementioned background difference method from the captured image stored in the main storage device 222 in step S400, and sets a moving object region based on the detected moving object. For example, when the image 500 shown in FIG. 5A is obtained, the detection unit 324 detects the workers 501, 502, and 503, so a moving object region is set for each of the detected workers 501, 502, and 503. An image 520 shows examples of the set moving object regions. In the image 520, moving object regions 521 to 523 are set for the positions of the workers 501 to 503 detected in the image 500. On the other hand, when the captured image 510 is obtained, the detection unit 324 detects no moving object, so no moving object region is set. An image 530 in FIG. 5D is an example of a background image to be used in moving object detection. Note that the detection unit 324 may also detect a moving object in a region other than the fixed region in the captured image. That is, the detection unit 324 may also execute no moving object detecting process in the fixed region.

In step S402, the rendering unit 325 renders a moving object mask on the moving object region set in the captured image in step S401. If no moving object is detected in the captured image in step S401, no moving object mask is rendered. In step S403, the setting determination unit 321 performs determination on the setting of the fixed region. In this embodiment, it is determined that a region 504 in the image 500 shown in FIG. 5A is set as the fixed region. As shown in the image 520 of FIG. 5C, the fixed region 504 overlaps the moving object region 523 set when the worker 503 is detected as a moving object. In step S404, the rendering unit 325 renders a fixed mask on the fixed region in the captured image. Note that no fixed mask is rendered if it is determined in step S403 that no fixed region is set. In step S405, the captured image obtained by the above processing is output to the display apparatus 140 via the output I/F 225.

Figure 6A:
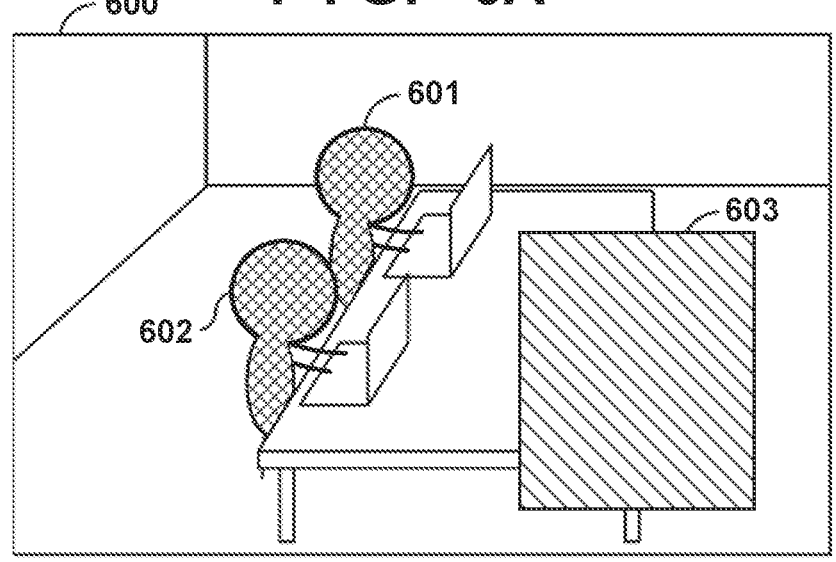
FIGS. 6A and 6B are views showing examples of output images in the system corresponding to the exemplary embodiment.
Figure 6B:
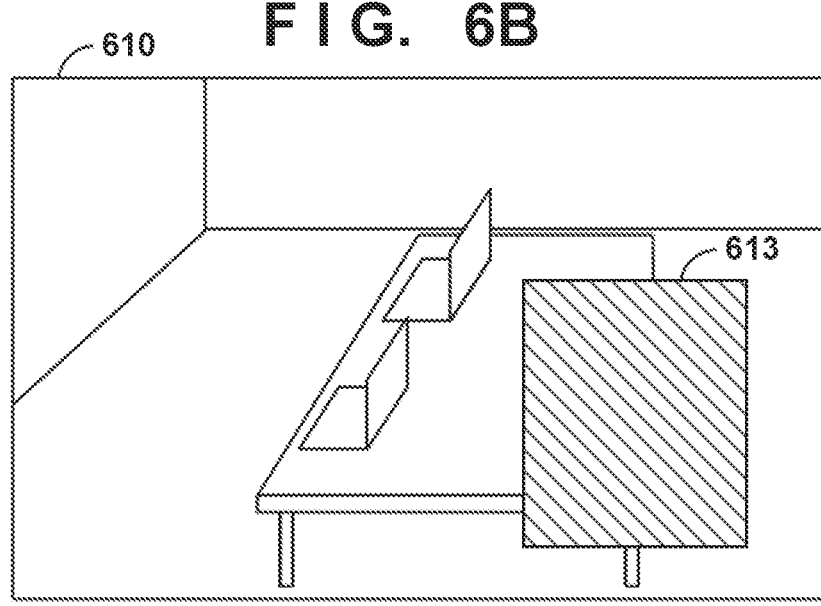

The output image obtained as a result of the above processing will be explained with reference to FIGS. 6A and 6B. FIGS. 6A and 6B show examples of captured images to be displayed on the display apparatus 140 when the captured images are the images 500 and 510 shown in FIGS. 5A and 5B. A displayed image 600 in FIG. 6A shows an example of a displayed image when the captured image is the image 500 shown in FIG. 5A. In the displayed image 600, moving object masks 601 and 602 are rendered on the moving object regions 521 and 522 that are respectively set for the workers 501 and 502 in the image 500. Also, a fixed mask 603 is rendered on the fixed region 504 in the image 500.

In this case, the procedure shown in FIG. 4 first renders a moving object mask on the moving object region 523 in step S402, and superimposes the fixed mask 603 on the fixed region 504 containing the moving object region 523 in step S404 after that. Therefore, the moving object mask rendered earlier on the moving object region 523 is overwritten by the fixed mask 603, so no moving object mask is visually recognizably rendered in the fixed region 504 on which the fixed mask 603 of the image 600 is rendered. Accordingly, the existence of the worker 503 in the fixed region 504 cannot be determined from the image 600 as the processing result, so the fixed region 504 can reliably be concealed.

The moving object mask can be an image corresponding to the shape of the moving object region, and can also be an image having an arbitrary shape including the moving object region. The fixed mask is an image having a shape including the fixed region. However, images applicable to these masks are not limited to specific images. For example, an image painted out by a predetermined pattern, a dot-pattern image, a stripe-pattern image, and an image painted out by a single color may also be used as the moving object mask and the fixed mask. In addition, a captured image obtained at a specific timing and an image pre-registered in the auxiliary storage device 223 may also be used as the moving object mask and the fixed mask. Furthermore, the moving object mask and the fixed mask can be rendered on the captured image by using alpha blending of the captured image and the moving object mask and fixed mask. Also, the moving object mask and the fixed mask need not be identical masks, and the rendering methods need not be the same. Note that when the moving object mask is enabled with the fixed mask being set, it is possible to notify the user to delete the setting of the fixed mask.

A displayed image 610 in FIG. 6B shows an example of a displayed image when the captured image is the image 510 shown in FIG. 5B. In the image 610, no moving object mask is rendered because there is no moving object in the image 510, and only a fixed mask 613 is rendered on the fixed region 504.

In this embodiment as explained above, when a captured image contains a moving object and a fixed region is set in the image, a fixed mask is superimposed on a moving object mask that is rendered earlier. Consequently, the moving object mask does not visually recognizably remain in a fixed mask region of a displayed image, so the fixed region can reliably be concealed.

Second Embodiment

In the above-described first embodiment, the method of reliably concealing a fixed region when the fixed region is set has been described. In the first embodiment, no fixed mask is superimposed on a prepared background image, so the display result on the display apparatus 140 is unaffected even when the setting of a fixed region is canceled (deleted). However, if the setting of a fixed region is canceled or the number of set fixed regions decreases when a fixed mask is superimposed on a background image, a partial region of a moving object having the same color as that of the fixed mask may be exposed in an image displayed on the display apparatus 140.

Assume that a captured image is an image 800 shown in FIG. 8A, and a background image is a background image 810 shown in FIG. 8B. The image 800 contains three workers 801 to 803 as moving bodies. On the other hand, a fixed mask 813 is set in the background image 810. When the background difference method is applied based on these two images, the workers 801 to 803 are detected as moving bodies. Then, moving object masks are rendered on moving object regions, and a fixed mask is further superimposed after that. In this process, the worker 803 is detected as a moving object, but a clothing portion (a part of the moving object) is not detected as a moving object because the color of the clothing of the worker 803 is the same as or similar to the color of the fixed mask 813. Consequently, no moving object mask is rendered on the clothing portion. Since, however, a fixed mask is rendered on a fixed region as long as the fixed region is set, the range of a moving object mask rendered on the worker 803 in a finally obtained image poses no problem.

When the setting of the fixed region is canceled, however, no fixed mask is superimposed on the moving object mask, so the moving object may not appropriately be concealed if the moving object mask is not appropriately rendered. As an example of a case like this, an image 820 in FIG. 8C shows an image as a result of rendering a moving object mask on the image 800. In the image 800, the color of the clothing of the worker 803 is gray, and is the same as the color of the fixed mask 813 in the background image 810. In this case, if it is determined that the value of the background difference shows no significant value in the clothing portion, set moving object regions are as shown in an image 820. In the image 820, hatched regions 821, 822, and 823 are moving object regions. In the moving object region 823, however, a rectangular region is not entirely hatched, and a clothing portion 824 of the worker 803 remains as the original clothing color.

A situation like this can occur after the setting of the fixed region is canceled and before the background image is recreated and updated. If the background image includes a fixed mask, the background image must be updated by a new background image from which the fixed mask is removed by canceling the setting of the fixed region. However, this update does not make it in time immediately after the setting is canceled, so the background image in which the fixed mask remains is used.

Accordingly, this embodiment provides a method of solving the problem that a detected moving object cannot appropriately be concealed until a background image is updated. In the following explanation, an explanation of the same contents as the first embodiment will be omitted. In this embodiment, the functional configuration of a client apparatus 120 is as shown in FIG. 3C. The client apparatus 120 of this embodiment can include a background creation unit 327 and a background determination unit 328, in addition to the functional configuration shown in FIG. 3B. The background creation unit 327 creates and updates a background image. In accordance with the result of determination of whether a fixed region is set performed by a setting determination unit 321, the background creation unit 327 creates a background image on which a fixed mask corresponding to a set fixed region is superimposed. Also, the background creation unit 327 updates the background image as needed in accordance with the determination result of the setting determination unit 321. The created background image is stored in an auxiliary storage device 223. The background determination unit 328 determines whether the background image used in moving object detection contains a fixed mask.

An example of an image output process in the client apparatus 120 corresponding to this embodiment will be explained below with reference to FIGS. 7A and 7B. In particular, processing which the client apparatus 120 performs to output an image on which a moving object mask and a fixed mask are superimposed will be explained. Processing complying with flowcharts shown in FIGS. 7A and 7B is processing for one captured image obtained by an imaging apparatus 110. Accordingly, when the imaging apparatus 110 transmits a plurality of captured images to the client apparatus 120, the client apparatus 120 performs the processing complying with the flowcharts shown in FIGS. 7A and 7B on each captured image.

Processes from steps S700 to S702 in FIG. 7A are the same as the processes from steps S400 to S402 in FIG. 4, so a detailed explanation thereof will be omitted. In step S703, the background determination unit 328 determines whether a background stored in the auxiliary storage device 223 and used in moving object detection contains an image of a fixed mask. This determination can be performed by, for example, determining whether an image of a fixed mask remains in a background image used in moving object detection by analyzing the background image. If the determination result indicates that the background used in moving object detection contains an image of a fixed mask, the process advances to step S704. On the other hand, if the background image does not contain an image of a fixed mask, the process advances to step S705. In step S704, a rendering unit 325 renders a fixed mask on a fixed region in a captured image obtained in step S700. In step S705, a display unit 326 outputs the captured image on which masks are superimposed by the mask rendering processes in steps S702 and S704 to a display apparatus 140 via an output I/F 225. This makes it possible to continue the process of superimposing the fixed mask until the background image containing the fixed mask for which the setting is canceled is updated to a new background image not containing the fixed mask.

The background image updating process will be explained below with reference to FIG. 7B. This updating process can be executed in parallel with the processing corresponding to the flowchart shown in FIG. 7A. Assuming that only one fixed region is set, a process of determining whether the state in which one fixed region is set has changed to a state in which the setting is canceled will be explained below. Note that the embodiment is not limited to this, and can include a case in which a plurality of fixed regions are set and the number of fixed regions decreases.

In step S710, the setting determination unit 321 obtains setting information of a fixed region from the auxiliary storage device 223. In step S711, the setting determination unit 321 determines whether the setting of the fixed region is canceled, based on the obtained setting information. If it is determined that the setting is canceled, the process advances to step S712. On the other hand, if it is determined that the setting is not canceled, the process returns to step S710. In step S712, the background creation unit 327 recreates a background image corresponding to the canceled fixed region and not containing a fixed mask. In step S713, the background image is updated by storing the background image recreated by the background creation unit 327 in the auxiliary storage device 223.

The case in which the background image is automatically updated has been explained above, but the update may also be executed in accordance with an instruction from the user of the system. Also, in the above-described processing, the background determination unit 328 determines whether the background image contains a fixed mask image by analyzing the background image. However, the determination method is not limited to this. For example, the background determination unit 328 can also store, in a main storage device 222, the date/time at which the fixed region is canceled, and determine that the background image contains a fixed mask if the period having elapsed from the stored date/time is less than a predetermined period, or determine that the background image contains no fixed mask if the elapsed period is equal to or longer than the predetermined period. The length of the predetermined period can be set based on an average time length during which the background creation unit 327 updates a background image on which a fixed mask is superimposed to a background image from which the fixed mask is removed.

Furthermore, the flowchart shown in FIG. 7A omits a process of determining whether a fixed region is set, which corresponds to step S403 in FIG. 4, but this determination process may also be executed. In this case, the process in step S703 can be executed if the determination process determines that no fixed region is set, or determines that the number of set fixed regions has decreased. In addition, if it is determined that a fixed region is set or the number of set fixed regions has not decreased, it is also possible to execute the process in step S704 by skipping the process in step S703.

When the captured image obtained in step S700 is the image 800 shown in FIG. 8A, a captured image output to and displayed by the display apparatus 140 in step S705 in the above processing is, for example, an image 830 in FIG. 8D. Moving object masks 831 and 832 are rendered in the regions of workers 801 and 802, and a fixed mask 833 is rendered in the fixed region of the image 800. An image obtained by processing like this is the captured image 830 in FIG. 8D.

In this embodiment as explained above, when a fixed mask is rendered in a background image, a moving object detected in a captured image can reliably be concealed even if the setting of the fixed region is canceled or the number of set fixed regions has decreased.

Third Embodiment

In the second embodiment, the processing when a fixed mask is rendered in a background image and the setting of the fixed region is canceled or the number of set fixed regions has decreased has been explained. In the third embodiment, processing when a new fixed region is set or the number of fixed regions has increased will be explained.

In the following explanation, an explanation of the same contents as the first embodiment will be omitted. In this embodiment, the functional configuration of a client apparatus 120 is as shown in FIG. 3C. Note that the client apparatus 120 need not include a background determination unit 328 in this embodiment.

In this embodiment, a setting determination unit 321 determines whether the setting of a fixed region is updated and a new fixed region is set. A background creation unit 327 recreates a background image for use in moving object detection, in accordance with the determination result of the setting determination unit 321. For example, the background creation unit 327 can create a background image by using one or a plurality of captured images.

An example of the image output process in the client apparatus 120 corresponding to this embodiment will be explained below with reference to FIG. 9. In particular, processing which the client apparatus 120 performs to output an image on which a moving object mask and a fixed mask are superimposed, while setting a new fixed region or recreating a background image in accordance with an increase in fixed regions, will be explained. Processing complying with a flowchart shown in FIG. 9 is processing for one captured image obtained by an imaging apparatus 110. Therefore, when the imaging apparatus 110 transmits a plurality of captured images to the client apparatus 120, the client apparatus 120 performs the processing complying with the flowchart shown in FIG. 9 on each captured image.

Processes in steps S900 to S904 are the same as the processes in steps S400 to S404 shown in FIG. 4, so a detailed explanation thereof will be omitted. In step S905, the setting determination unit 321 determines whether a fixed region is newly set, based on the setting of a fixed region obtained in step S903. The setting determination unit 321 can perform this determination by holding the fixed region setting information obtained by the last determination in a main storage device 222, and comparing this fixed region setting information with the fixed region setting information obtained in step S903. If this determination result indicates that a fixed region is newly set, the process advances to step S906. On the other hand, if a fixed region is not newly set, the process advances to step S907. In step S906, the background creation unit 327 recreates a new background. The background creation unit 327 stores the new background image in an auxiliary storage device 223, thereby updating the background image used in moving object detection in step S901. In step S907, a captured image obtained by the rendering processes in steps S902 and S904 is output to a display apparatus 140 via an output I/F 225.

In this embodiment as described above, if it is determined that a new fixed region is set or the number of fixed regions has increased, the fixed region can reliably be concealed by discarding a background image used up to that point and recreating a new background image. Note that each exemplary embodiment has been described in detail above, but the embodiment is not limited to the individual embodiments according to the description, and it is also possible to freely combine the above-described embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-145412 filed on Aug. 1, 2018 which is hereby incorporated by reference herein in its entirety.

What is claimed is:

1. An image processing apparatus comprising:
one or more processors;
a memory; and
a program stored in the memory which, when executed by the one or more processors, causes the one or more processors to perform:
  detecting a foreground object in a captured image obtained by an imaging unit;
  superimposing, on the captured image obtained by the imaging unit, a first image formed by anonymizing a region of the foreground object, and a second image formed by anonymizing a region designated by a user on the captured image; and
  controlling a display unit to display an output image on which the first image and the second image are superimposed,
  wherein an appearance of the second image is different from an appearance of the first image, and
  if the foreground object is detected in the region designated by a user, in which the second image is to be superimposed on the captured image, the first image is not displayed on the output image displayed on the display unit and the second image is displayed on the output image displayed on the display unit.

2. The apparatus according to claim 1, wherein the region of the foreground object is extracted based on a difference between a background image and the captured image.

3. The apparatus according to claim 1, wherein in the superimposing, the second image is superimposed on the captured image on which the first image is superimposed, and
wherein in the controlling, the display unit is controlled to display an output image on which the first image and the second image are superimposed in the superimposing.

4. The apparatus according to claim 2, wherein the program which, when executed by the one or more processors, causes the one or more processors to further perform:
performing a determination on a setting about superimposition of the second image on the captured image;
creating the background image,
wherein if it is determined that the setting for superimposing the second image on the captured image is canceled, in the creating, an updated background image not containing the second image is created, and
in the superimposing, the second image is superimposed on the captured image on which the first image is rendered, until the updated background image is created in the creating.

5. An image processing apparatus control method comprising:
detecting a foreground object in a captured image obtained by an imaging unit;
superimposing, on the captured image obtained by the imaging unit, a first image formed by anonymizing a region of the foreground object, and a second image formed by anonymizing a region designated by a user on the captured image obtained by the imaging unit; and
controlling a display unit to display an output image on which the first image and the second image are superimposed,
wherein an appearance of the second image is different from an appearance of the first image, and
in response to detecting the foreground object in the region designated by a user, in which the second image is to be superimposed on the captured image, the first image is not displayed on the output image displayed on the display unit and the second image is displayed on the output image displayed on the display unit.

6. A non-transitory computer-readable storage medium storing one or more program including instructions that, when executed by a processor of an image processing apparatus, causes the processor to perform operations of:
- detecting a foreground object in a captured image obtained by an imaging unit;
- superimposing, on the captured image obtained by the imaging unit, a first image formed by anonymizing a region of the foreground object, and a second image formed by anonymizing a region designated by a user on the captured image obtained by the imaging unit; and
- controlling a display unit to display an output image on which the first image and the second image are superimposed,
- wherein an appearance of the second image is different from an appearance of the first image, and
- if the foreground object is detected in the region designated by a user, in which the second image is to be superimposed on the captured image, the first image is not displayed on the output image displayed on the display unit and the second image is displayed on the output image displayed on the display unit.

* * * * *